Figure 1:
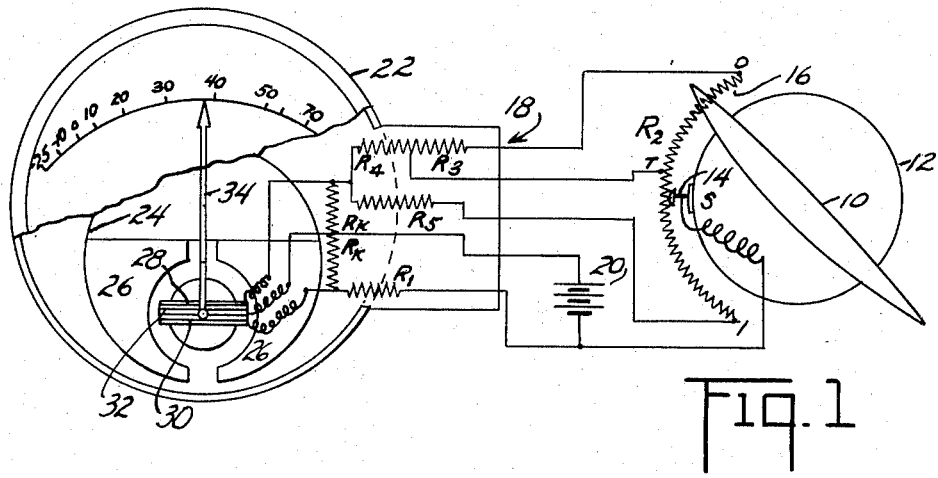

Aug. 4, 1959     W. JORDAN 3D     2,898,551

RATIO METER BLADE PITCH INDICATORS

Filed July 22, 1954

INVENTOR
WILLIAM JORDAN 3d
BY
ATTORNEY

United States Patent Office 2,898,551
Patented Aug. 4, 1959

2,898,551

RATIO METER BLADE PITCH INDICATORS

William Jordan 3d, Glen Ridge, N.J., assignor to Curtiss-Wright Corporation, a corporation of Delaware Application July 22, 1954, Serial No. 445,144

1 Claim. (Cl. 324—62)

This invention relates to electrical instruments and associated circuits of the type used for indicating the state of adjustment of apparatus or mechanisms.

The improvements afforded by my invention provide an indicating circuit whose accuracy is substantially independent of energizing voltage, and wherein scale readings on the indicator can be compressed or expanded, whereby greater reading accuracy is available from expanded scale portions, and lesser reading accuracy is available from compressed scale portions. Quantities to be measured, whether linear or non-linear in their variation, may be indicated through use of my invention, on non-linear scale, or scales having different degrees of linearity than the quantity variation.

Objects of the invention are, to provide a measuring and indicating system wherein operation of the system and precision of indications are relatively insensitive to power source voltage fluctuations by use of a ratio meter; to provide scale-expansion means in an indicating system, to enable large-scale readings to be made on parts of an instrument scale where accuracy is required, and to enable small-scale readings to be made on other parts of an instrument scale where accuracy is not important.

This invention is useful in aeronautical propeller systems but is not limited thereto. In certain propeller systems, indication of the pitch position of the propeller blades is required. This is attained, frequently, by disposing a potentiometer or variable resistor in association with the propeller hub and blade, the potentiometer or resistor being secured to the hub and the slider being secured to the blade.

Potentiometer or resistor output voltage then becomes a function of propeller blade angle and the voltage is imposed on a voltmeter, milliammeter or galvanometer calibrated to read, directly, in degrees of blade angle. The usual modern propeller has a range of blade angle of about 120°, from the "feather" position of about 90° through flat pitch or 0° blade angle to about −30° or negative blade angle whereat reverse thrust is developed. The normal blade angle range for cruising and take-off of aircraft lies from around 20° to 50° of positive blade angle. It is in this latter range where precise blade angle indication is desirable, and where blade angle readings within ½° are wanted. Above and below this range, a much lower accuracy is tolerable, for the blades pass through the marginal ranges in their transition between the normal and the feather or reverse pitch positions as a transient movement and do not, ordinarily, remain at any one setting in the marginal ranges.

A calibrated dial indicator may have an angular scale of about one quadrant (representing 100% of the scale). My invention enables the compression of the lower 40° of blade angle, from −25° to +15°, into the lower 20% of the indicator scale; the expansion of the middle 35° of blade angle, from +15° to +50°, into the next 60% of the scale; and the compression of the higher 40° of blade angle into the next and last 20% of the indicator scale.

The same principles as are used to accomplish this result are applicable to other utilizations, and various degrees of scale expansion and compression may be designed into the circuit. While, in the propeller pitch indicating environment, the signal from the propeller is preferably substantially linear in its variation, non-linear signals can be used and converted in the circuit to linear indications, or to indications having a different order of non-linearity from the signals.

Figure 2:
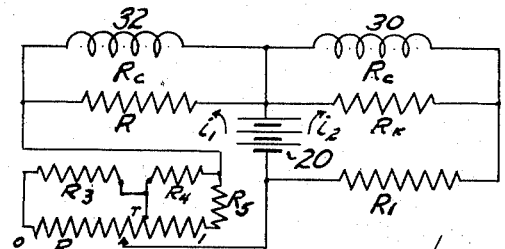
Figure 3:
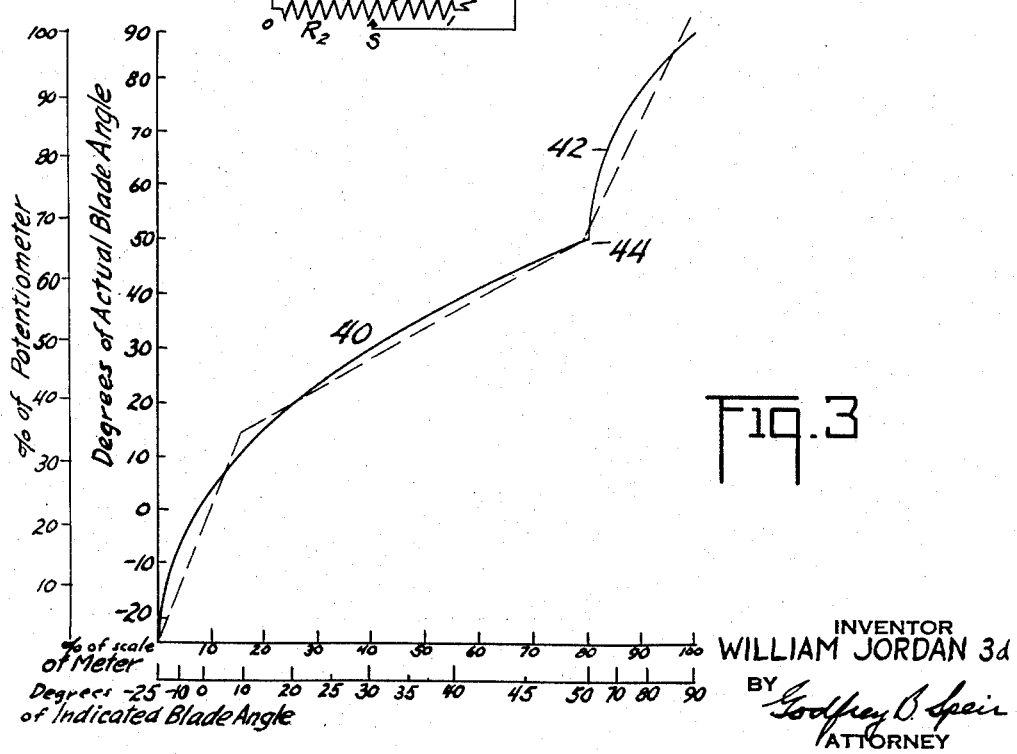

An example of the present invention as applied to a propeller blade pitch indicator is shown in the attached drawings, wherein similar reference characters indicate similar parts and wherein:

Fig. 1 is a diagram showing some structural components of a propeller blade and indicator and including circuit components, Fig. 2 is a wiring diagram, and Fig. 3 is a calibration diagram.

In Fig. 1, a propeller blade 10 is mounted for pitch change in suitable structure, not shown. The blade extends from a blade butt 12 carrying a slider 14 engaged with the windings of a potentiometer rheostat or variable resistor 16 secured to the propeller hub, the windings being connected by circuits generally indicated at 18 and a D.C. power source 20 to an indicating instrument 22. The latter is a ratio meter, comprising a permanent magnet 24 having pole pieces 26. Between the pole pieces, a rotor 28 is pivoted, which carries two coils 30 and 32 and an indicating needle 34. This ratio meter, a standard commercial article, has a normally linear calibration based on the ratio of currents in the coils 30 and 32. For instance, if the current in coil 30 be $i_2$ and that in the coil 32, $i_1$, $i_2/i_1$ may vary from 1/1.3 to 1.3/1 in a typical meter. The 1/1.3 ratio provides 0 reading on the meter scale, the radio 1/1 provides a mid-scale reading, and the ratio 1.3/1 a full scale reading. So long as current ratios are consistent, voltage may vary over a considerable range without affecting meter accuracy.

The invention consists in using a linear potentiometer or variable resistor which picks off a quantity to be measured, such as blade angle, and in providing circuits, including resistors, which produce ratios $i_2/i_1$ of a desired pattern from the potentiometer or variable resistor 16.

For pitch indicating purposes a calibration is desired as in the dotted line of Fig.3. This is difficult to attain, but is closely approached by the solid line of Fig. 3 which results from my circuit arrangement.

Scale expansion and contraction on the indicator is shown in Fig. 1, and is also shown in Fig. 3. As previously mentioned, low blade angles are compressed in the left end of the scale for a reading accuracy of 1 to 3 degrees, medium blade angles are expanded in mid-scale for a reading accuracy of ½ degree, and high blade angles are compressed in the right end of the scale for a reading accuracy of about 5 degrees, but at the top of the scale the reading accuracy is about 1°.

Scale expansion and contraction is attained by the circuit arrangement 18 as shown, wherein resistances are incorporated in a suitable manner in the ratio meter inputs to yield the desired scale non-linearity.

Referring to Fig. 2, which shows the wiring diagram of Fig. 1 in easier-to-follow form, the meter coils 30 and 32 are shunted by fixed resistors $R_k$ of a value for critical damping, $R_k$ being equal to the coil resistances. Each coil and its resistor $R_k$ have an equivalent resistance $R_c$. An exemplary ratio meter, a Weston Model 728 Ratio Meter, has coil resistance of 70 ohms and tolerates coil currents 5 to 20 milliamperes (ma.). If $R_k$ is 70 ohms, $R_c$ (the equivalent of $R_k$ and the coil resistance) is 35 ohms, and $i_1$ or $i_2$ can vary from 10 to 40 ma.

In my invention, I maintain the current $i_2$ in coil 30 substantially constant, and vary the current $i_1$ in coil 32 above and below $i_2$. For an impressed normal voltage of 28, I establish $i_2$ at 20 ma., whereupon $R_1$ will have a value of 1365 ohms.

That is, $$R_1 = \frac{28 \text{ v.}}{.02 \text{ amp.}} - 35 = 1365 \text{ ohms}$$

Since the meter ratio is 1.3 from mid-scale to zero or full scale, mid scale $i_1$ will be 20 ma.
min. $i_1$ will be $20/1.3 = 15.4$ ma.
max. $i_1$ will be $20 \times 1.3 = 26$ ma.

Now I provide a resistor assembly comprising the potentiometer resistance $R_2$, and fixed resistors $R_3$, $R_4$, and $R_5$, connected as shown. These have an equivalent resistance $R_e$. $R_e$ must have the following values to cover the full scale of the ratio meter.

At 0 meter scale $1400 \times 1.3 - 35 = 1785$ ohms
At 100% meter scale $1400/1.3 - 35 = 1040$ oms This range of $R_e$ could, of course, be secured linearly by making $R_2$ merely a variable resistor wherein the slider S moves over a rheostat of 745 ohms in series with a fixed resistor of 1040 ohms.

But the desideratum is to secure a non-linear variation of $i_1$. To this end, by mathematical analysis, I select the following resistance values:

$R_2 = 1960$ ohms
$R_2' = R_2$ from end 0 of potentiometer to tap $T = 1270$ ohms
$R_2'' = R_2$ from T to end 1 of potentiometer $= 690$ ohms
$R_3 = 1270$ ohms
$R_4 = 2300$ ohms
$R_5 = 1600$ ohms Tap T is chosen at .65 of distance from 0 to 1 on the potentiometer $R_2$.

As the slider S moves from 0 to T on the potentiometer $R_2$, the resistance $R_e$ will change nonlinearly along the curve of Fig. 3, the curve stopping short of an apex due to the series resistances $R_4$, $R_5$, and the part of $R_2$ between T and 1.

As the slider moves from T to 1 on the potentiometer $R_2$, the resistance $R_e$ varies along curve 42 in Fig. 3 in similar fashion to the left end of curve 40, but starting from the point 44 at the end of curve 40.

The manner in which the values of $R_e$ are established is shown by the following: with slider S between 0 and T, $T' - S'$ is the equivalent of the resistance from S to T divided by the resistance from 0 to 1, and S' is the equivalent of the resistance from 0 to S divided by the resistance from 0 to 1.

$$R_e = \frac{R_4(R_2'' + R_5)}{R_4 + R_2'' + R_5} + \frac{(T' - S')R_2(S'R_2 + R_3)}{R_3 + R_2'}$$

which reduces, with values specified, to $$R_e = 1150 + 980(.65 - S)(1.54S + 1)$$

With slider S between T and 1, S' and T' are respectively equivalent to the resistance from 0 to S and from 0 to T, respectively divided by the resistance from 0 to 1. Here, S' minimum must be equal to or greater than T'.

$$R_e = \frac{[R_4 + (S' - T')R_2][R_5 + (1 - S')R_2]}{R_4 + R_5 + R_2''}$$

which reduces, with values specified, to $$R_e = 837(ST.52)(1.82 - S)$$

Tabulating values:

| S | $R_e$ | $\frac{i_2}{i_1}$ |
|---|---|---|
| 0 | 1,785 | 1.3 |
| 10 | 1,770 | 1.29 |
| 20 | 1,727 | 1.26 |
| 30 | 1,650 | 1.20 |
| 40 | 1,547 | 1.13 |
| 50 | 1,412 | 1.03 |
| 60 | 1,242 | .91 |
| 65 | 1,150 | .846 |
| 70 | 1,142 | .84 |
| 80 | 1,127 | .83 |
| 90 | 1,092 | .804 |
| 100 | 1,040 | .768 |

$$\frac{i_2}{i_1} = \frac{R_e + R_c}{R_1 + R_c} = \frac{R_e + 35}{1400}$$

The foregoing data forms the basis for the calibration curve of Fig. 3.

From the foregoing, it can be appreciated that many variations may be made in the indicator calibration, by shunting different parts of a potentiometer with fixed resistances of suitable value and by selecting series resistances and taps along the potentiometer. Thereby potentiometer network resistance may be caused to follow any desired pattern, to produce a current for comparison with a fixed current value in a ratio meter circuit.

Though but one embodiment of the invention has been illustrated and described herein, it is to be understood that the invention may be applied in other and various forms. Changes may be made in the arrangements shown without departing from the spirit of the invention. Reference should be had to the following claim for determining the limits of the invention.

What is claimed is:

In combination, a coil of a ratio meter, a non-linear variable resistance network for controlling the coil including a first circuit of at least one resistance and a second circuit of a plurality of resistances in series, said circuits having their one ends connected to one end of the coil, the second circuit having one resistance disposed between other resistances, a slider movable over the said one resistance of the second circuit, circuit means separate from the first and second circuits connecting the slider to the other end of said coil, the first and second circuits being connected at their other ends to each other and being directly connected at such other ends to a tap intermediate the said one resistance of the said second circuit.

References Cited in the file of this patent

UNITED STATES PATENTS

| | | |
|---|---|---|
| 1,614,535 | Packard | Jan. 18, 1927 |
| 2,444,624 | Anderson | July 6, 1948 |
| 2,461,425 | Kelly | Feb. 8, 1949 |
| 2,532,368 | Malmqvist | Dec. 5, 1950 |
| 2,648,819 | Gustafsson | Aug. 11, 1953 |